(12) United States Patent
Irie

(10) Patent No.: US 8,405,902 B2
(45) Date of Patent: Mar. 26, 2013

(54) IMAGING APPARATUS AND OPTICAL FILTER

(75) Inventor: Yoshiaki Irie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 12/273,390

(22) Filed: Nov. 18, 2008

(65) Prior Publication Data

US 2009/0168154 A1 Jul. 2, 2009

(30) Foreign Application Priority Data

Dec. 28, 2007 (JP) ................................ 2007-341263

(51) Int. Cl.
*G06K 7/10* (2006.01)
*F21V 9/04* (2006.01)
(52) U.S. Cl. ........................................ 359/350; 359/359
(58) Field of Classification Search ........................ None
See application file for complete search history.

(56) References Cited

U.S. PATENT DOCUMENTS

| 5,820,779 | A | 10/1998 | Shouji |
| 2004/0090549 | A1* | 5/2004 | Takizawa et al. ............ 348/340 |
| 2005/0088563 | A1* | 4/2005 | Ito et al. ........................ 348/335 |
| 2006/0215266 | A1 | 9/2006 | Uehara et al. |
| 2007/0211162 | A1* | 9/2007 | Kaihara et al. ................ 348/335 |
| 2008/0068488 | A1* | 3/2008 | Kawai ........................... 348/335 |

FOREIGN PATENT DOCUMENTS

| CN | 1841100 A | 10/2006 |
| JP | 08-122708 A | 5/1996 |
| JP | 10-186284 A | 7/1998 |
| JP | 2004-061829 A | 2/2004 |
| JP | 2004-064554 A | 2/2004 |
| JP | 2004-301891 A | 10/2004 |
| JP | 2006-173855 A | 6/2006 |

* cited by examiner

*Primary Examiner* — Jade R Chwasz
(74) *Attorney, Agent, or Firm* — Canon USA Inc IP Division

(57) ABSTRACT

An imaging apparatus includes an image sensor, a first optical member disposed ahead of a front of the image sensor, a second optical member disposed between the first optical member and the image sensor, and a holder. The holder elastically retains the first optical member and retains the second optical member so that the second optical member is opposed to the elastically retained first optical member. The imaging apparatus further includes a film-like resin filter disposed between the first optical member and the second optical member that is bonded to at least one of the first optical member and the second optical member.

4 Claims, 7 Drawing Sheets

IMAGING APPARATUS AND OPTICAL FILTER

BACKGROUND OF THE INVENTION

1. Field of the Invention

The present invention relates to an imaging apparatus and an optical filter. More specifically, the present invention relates to an imaging apparatus that includes an optical low-pass filter disposed between an image sensor and a photographic lens to suppress a phenomenon of fake color that may occur due to a pseudo signal of an object image on an image sensor and relates to an optical filter.

2. Description of the Related Art

In a conventional imaging optical system for forming an object image on an image sensor such as a charge-coupled device (CCD) or a complementary metal-oxide semiconductor sensor (CMOS), a optical low-pass filter is generally used to restrict a high spatial frequency component of object reflection light and remove a color component different from the object reflection light that may appear due to a pseudo signal.

In this regard, an optical low-pass filter that utilizes a birefringent effect of a plurality of mutually laminated crystal plates is widely used. However, the anisotropy of a refractive index of a crystal plate is not so high. Accordingly, in order to obtain a predetermined spatial frequency to be restricted, it is generally necessary to use a crystal plate whose thickness is approximately 1 mm.

In a conventional method, an optical low-pass filter is constituted by three crystal plates in total, namely, two birefringent crystal plates and a $\lambda/4$-wave plate disposed between the two birefringent crystal plates. Furthermore, an infrared-light cut filter is bonded to the optical low-pass filter having the above-described configuration. The optical low-pass filter like this is fixed in a retaining frame. As a consequence, in the conventional method, the total thickness of the optical low-pass filter may become large. Therefore, it becomes difficult to reduce the size and weight of an apparatus. Furthermore, the optical performance may degrade due to increased aberrations or harmful phenomena such as ghosts.

On the other hand, a material having a high level of the anisotropy of the refractive index such as lithium niobate is known. When this material is used, since the anisotropy of the refractive index is high, thickness necessary to obtain the predetermined spatial frequency to be restricted can be far thinner than that in the case of a crystal plate.

However, in the case of using the lithium niobate, it is technically difficult to achieve an appropriately thin optical low-pass filter. Furthermore, it is technically difficult to appropriately laminate the components of the optical low-pass filter. As a result, manufacturing costs for the optical low-pass filter using the lithium niobate may increase.

On the other hand, Japanese Patent Application Laid-Open No. 08-122708 discusses a method related to a polymeric optical low-pass filter. More specifically, the method that Japanese Patent Application Laid-Open No. 08-122708 discusses is related to an optical anisotropic polymer film having a birefringent effect the same as a crystal plate.

Furthermore, Japanese Patent Application Laid-Open No. 10-186284 discusses a method for using a polyimide film having a depolarization effect instead of using a usual $\lambda/4$-wave plate which is constituted by crystal. By this method, a polarization state of a light beam emitted from a birefringent plate of the optical low-pass filter is converted into an approximately circularly polarized light beam.

Furthermore, acrylic resin, that is, an infrared light absorbing film that contains an infrared light absorbent has been marketed. The infrared light absorbing film has the optical performance equivalent to that of an infrared light absorbing glass.

The above-described film-like filter and the infrared light absorbing film are easy to manufacture. The optical low-pass filter including the infrared light absorbing filter using the above-described materials can be readily reduced in its size and weight. Furthermore, its manufacturing costs can be reduced.

However, the environmental resistance (in particular, the resistance to moisture) of the optical filter using the above-described resin film is low. More specifically, the resin substrate is easy to absorb moisture compared to a crystal material such as quartz. Accordingly, if a resin substrate is exposed to the air, the resin substrate absorbs moisture. Thus, the optical performance of a resin substrate may easily decrease and the optical performance of an optical filter like this can easily degrade.

In order to solve this problem, Japanese Patent Application Laid-Open No. 2004-301891 discusses a method for manufacturing an optical low-pass filter that has the improved environmental resistance. The optical low-pass filter discussed in the above Japanese Patent Application includes an optical anisotropic polymer film (the resin substrate) sandwiched between optical members such as a transparent glass or a infrared light absorbing glass having a high moisture resistance.

Furthermore, in the case where an anti-reflection evaporated film is coated on a surface of optical resin film constituting an optical filter, the adhesion of the evaporated film may be lower than the adhesion of a glass plate or a crystal plate. Accordingly, the evaporated film coated on a surface of the optical resin film may be easily delaminated.

With respect to an optical low-pass filter generated by a method discussed in Japanese Patent Application Laid-Open No. 2004-301891, the film surface is not exposed to the outside, therefore, it is not necessary to provide anti-reflection coating for a film plane. Accordingly, the method discussed by Japanese Patent Application Laid-Open No. 2004-301891 is effective in solving the above-described problem.

Generally, an array of conventional color filters corresponding to pixels of an image sensor is based on the Bayer array constituted by four pixels of RGBG. In this case, a phenomenon of fake color in a photographed image can be suppressed by employing an optical low-pass filter performing a four-point image division. In the four-point image division, a single spot light beam which is incident on an optical low-pass filter is divided into four points of light beams.

FIG. 7 illustrates an example of a common optical low-pass filter made from four laminated optical members to perform the four-point image division.

Referring to FIG. 7, a birefringent crystal plate 700 having a rotational angle of 0° is constituted by a birefringent material, such as crystal, and the birefringent crystal plate 700 performs a two-point division in a horizontal direction. An infrared light absorbing filter 702 is used for approximately matching a spectral sensitivity of the image sensor such as a CCD with a visibility of a person.

A $\lambda/4$-wave plate 710 is made of crystal. The $\lambda/4$-wave plate 710 is used for depolarizing object reflection light that has been linearly polarized by the birefringent crystal plate 700.

The object reflection light then transmits through a birefringent crystal plate 706c having the rotational angle of 90°. As described above, the point image division is performed in a vertical direction.

The four-point-divided object reflection light is finally incident on an image sensor 706. Thus, the fake color that may occur in a photographed image can be suppressed due to the low-pass effect.

Furthermore, a cover glass 711 is used to seal a chip portion 706a of the image sensor 706 in a ceramic package 706b.

In the case of the above-described configuration, if the above optical anisotropic polymer film having the birefringence effect, a polyimide film having a depolarization effect, and an infrared light absorbing film having an infrared light absorption effect are used for the surface of the birefringent material 700, a sufficient environmental resistance cannot be achieved. More specifically, the surface of a resin film, whose environmental resistance is low, is exposed to the air. Therefore, in this case, the optical low-pass filter configured as above described may possess low reliability for an actual use.

Furthermore, since a film material itself is soft compared to crystal, a scratch or a defect may easily occur with respect to the optical low-pass filter having the above-described configuration. Accordingly, such optical low-pass filter requires careful handling.

SUMMARY OF THE INVENTION

The present invention is directed to an imaging apparatus including an optical low-pass filter useful in reducing the size, the weight, and the costs of the imaging apparatus.

According to an aspect of the present invention, an imaging apparatus includes an image sensor, a first optical member ahead of a front of the image sensor, a second optical member disposed between the first optical member and the image sensor, and a holder. The holder elastically retains the first optical member and retains the second optical member so that the second optical member is opposed to the elastically retained first optical member. The imaging apparatus further includes a film-like resin filter disposed between the first optical member and the second optical member that is bonded to at least one of the first optical member and the second optical member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

First Exemplary Embodiment

Figure 1:
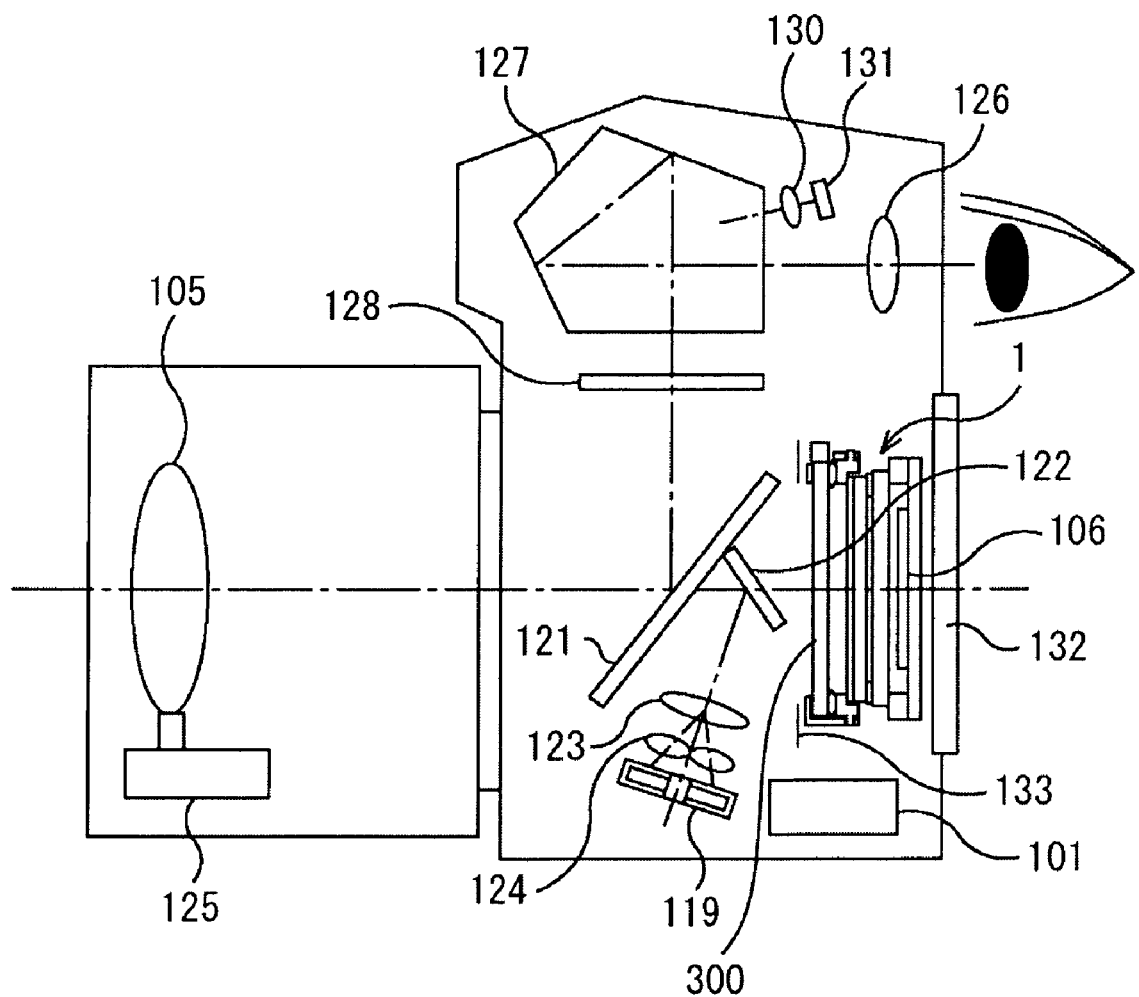
FIG. 1 illustrates an example of a configuration of a digital camera which is an imaging apparatus according to an exemplary embodiment of the present invention.

A first exemplary embodiment of the present invention will now be described below. FIG. 1 illustrates an example of a configuration of a digital camera (digital single lens reflex camera) which is an imaging apparatus according to an exemplary embodiment of the present invention. Referring to FIG. 1, the digital camera includes a central processing unit (CPU) 101. The CPU 101 controls the operation of the entire digital camera.

A photographic lens system of the digital camera includes a photographic lens 105. The photographic lens 105 forms an image of light reflected from an object on an image sensor 106 as an object optical image. The image sensor 106 such as a CCD photoelectrically converts the object optical image.

A focal plane shutter (hereinafter simply referred to as a "shutter") 133 controls the light amount of the light reflected from the object that is incident on the image sensor 106 from the photographic lens 105.

Furthermore, the digital camera includes a semi-transparent main mirror 121 and a submirror 122. A part of the light reflected from the object that has been image-formed by the photographic lens 105 is then guided to a publicly known phase difference type focus detection unit via the semi-transparent main mirror 121 and the submirror 122. Thus, a defocusing amount can be detected which indicates the amount and the direction of defocus of the object image formed by the photographic lens 105 relative to a light-receiving surface of the image sensor 106.

Now, the phase difference type focus detection unit is described below. The phase difference type focus detection unit includes a field lens 123, a secondary image forming lens 124, and a focus detection CCD line sensor 119. The phase difference type focus detection unit can detect a focus with respect to fifteen areas of a viewfinder screen (vertical 3 areas×horizontal 5 areas).

The CPU 101, based on the above-described defocus amount, sends a drive amount pulse for driving the photographic lens 105 to the photographic lens drive unit 125, considering the sensitivity of lens drive (fineness of control which is unique to each lens) of the photographic lens 105.

Then, the photographic lens drive unit 125 drives a pulse motor to drive the photographic lens 105 to a focusing position according to the pulse which has been sent from the CPU 101. Thus, the photographic lens drive unit 125 can perform automatic focusing.

A focusing screen 128 is disposed on an image forming plane equivalent to an image forming plane of the image sensor 106 of the photographic lens 105. The light reflected from the object and has transmitted through the photographic lens 105 is then reflected on the semi-transparent main mirror 121. The reflection light from the semi-transparent main mirror 121 is image-formed on the focusing screen 128.

Furthermore, the digital camera includes a pentagonal prism 127. The pentagonal prism 127 is an optical reversing unit for reversing an image.

Furthermore, the digital camera includes an eyepiece lens 126. A photographer can look at an object image formed on the focusing screen 128 via the eyepiece lens 126. The eyepiece lens 126 has a configuration of a through-the-lens (TTL) type optical viewfinder.

Furthermore, the digital camera includes an imaging lens 130 and a light metering sensor 131. The light metering sensor 131 is a sensor for metering the luminance of the visible light reflected from the photographed object.

The object image formed by the imaging lens 130 on the focusing screen 128 is formed on the light metering sensor 131 as a secondary image.

The light metering sensor 131 includes a light receiving area divided into 3×5 (vertical and horizontal) areas. The light metering sensor 131 can measure the light by dividing a main area of the viewfinder field of the digital camera (the object area) into 3×5 areas.

Furthermore, the digital camera includes a display unit 132. The display unit 132 includes a thin film transistor (TFT) color liquid crystal display.

An optical filter 1 is disposed in a front portion of the image sensor 106 as a unit. The optical filter 1 attenuates a high frequency component of a light flux that transmits through the optical filter 1. Thus, the optical filter 1 cuts the infrared light wavelength component of the light flux.

A birefringent crystal plate 300 disposed on a surface closest to the photographic lens 105 has a vibration function for removing foreign substances such as dusts. The optical filter 1 will be described in detail later below.

In the digital camera having the above-described configuration, when the photographer presses a release switch (SW) 114 (FIG. 2), the semi-transparent main mirror 121 retracts to an outside of an optical path of the photographic lens 105. At this time, furthermore, the light amount of the light reflected from the object and which has been condensed by the photographic lens 105 is controlled by the shutter 133. The light reflected from the object is photoelectrically converted as the object image The light reflected from the object is then subjected to photoelectric conversion processing by the image sensor 106. Thus, an object image is formed. Then, the light reflected from the object that has been photoelectrically converted by the image sensor 106 is recorded on a recording medium such as a flash memory as image data. Meanwhile, the recorded image data is displayed on the display unit 132 as a photographed image.

Figure 2:
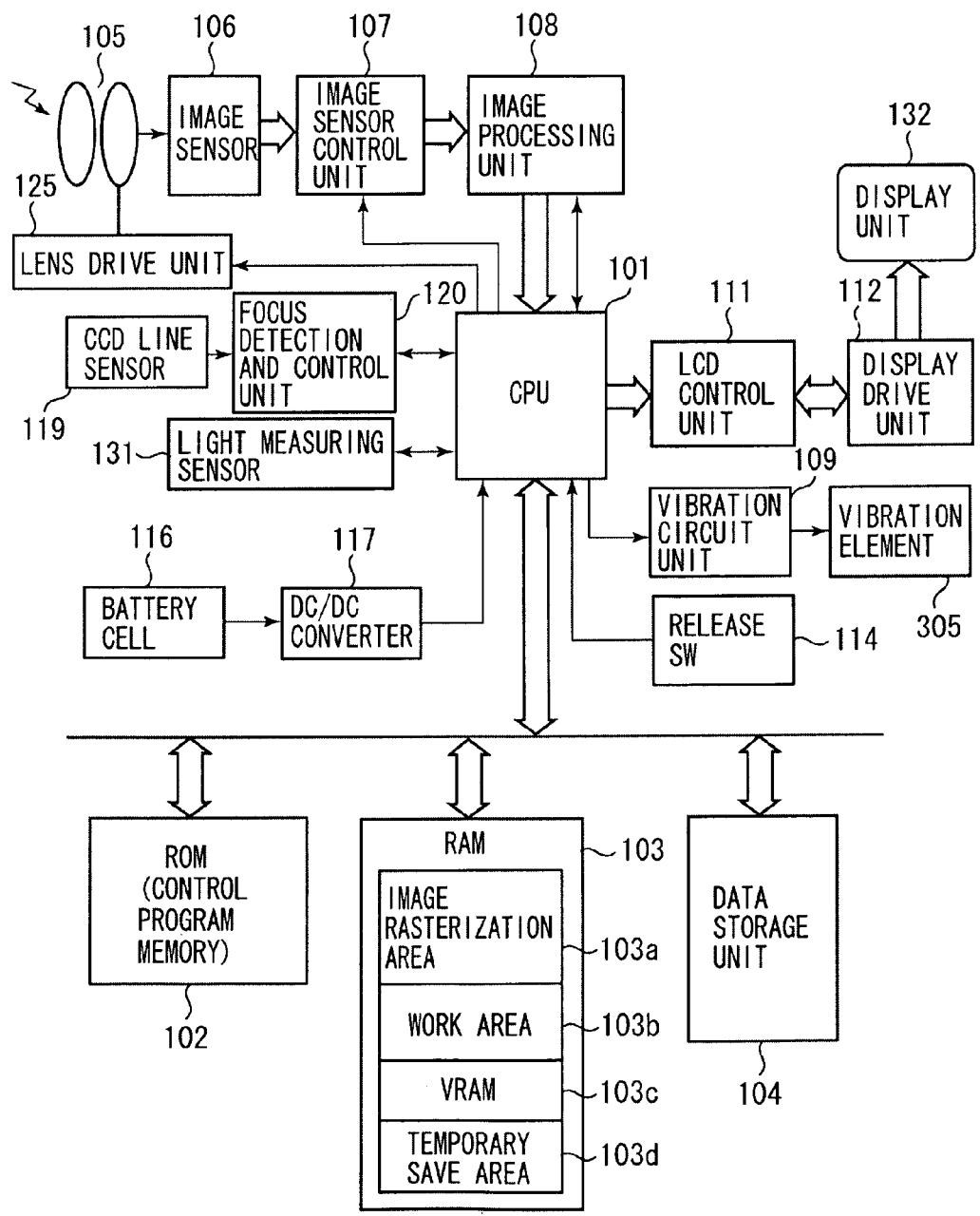
FIG. 2 illustrates an electrical configuration of the digital camera according to a first exemplary embodiment of the present invention.

FIG. 2 is an electrical block diagram that illustrates an example of a configuration of the digital camera according to the first exemplary embodiment of the present invention. The components and units that are the same as those illustrated in FIG. 1 are provided with the same numerals and symbols. Accordingly, the detailed description thereof is not repeated here.

In FIG. 2, a read-only memory (ROM) 102 that stores a control program and a random access memory (RAM) 103 are connected to the CPU 101.

Furthermore, a data storage unit 104, an image processing unit 108, a liquid crystal display (LCD) control unit 111, the release SW 114, and a vibration circuit unit 109 are connected to the CPU 101.

In addition, a direct current (DC)/DC converter 117 that supplies power to the digital camera is connected to the CPU 101. Furthermore, the light metering sensor 131, a focus detection and control unit 120, and the photographic lens drive unit 125 are connected to the CPU 101.

The image sensor control unit 107 and the image sensor 106 are connected to the image processing unit 108. The image sensor 106 has approximately 5,000,000 effective pixels (2,560×1,920 pixels), for example.

The display drive unit 112 and the display unit 132 are connected to the LCD control unit 111. The display unit 132 displays a 340×240 image obtained by thinning out an original image, which has been photographed by the image sensor 106, to one-eighth of its original size vertically and horizontally.

In addition, the digital camera includes a battery cell 116. The battery cell 116 supplies power to the DC/DC converter 117.

A vibration element 305 is connected to the vibration circuit unit 109. The vibration element 305 includes a piezoelectric element, for example. The vibration element 305 is bonded and fixed on the birefringent crystal plate 300, which is disposed on a surface of the optical filter 1 closest to the photographic lens 105. The vibration element 305 vibrates to remove foreign substances such as dusts. The CPU 101 sends an instruction to the vibration circuit unit 109 to control the vibration of the vibration circuit unit 109.

The CPU 101 performs various types of control based on the control program stored on the ROM 102. The control includes processing for reading a signal of the photographed image output from the image processing unit 108 and direct memory access (DMA)-transferring the read image signal to the RAM 103 and processing for DMA-transferring the data from the RAM 103 to the LCD control unit 111.

Furthermore, the CPU 101 performs processing for Joint Photographic Experts Group (JPEG)-compressing the image data and storing the JPEG image in the data storage unit 104 as an image file. In addition, the CPU 101 issues an instruction for changing the number of pixels of data to be captured and performing digital image processing to the image sensor 106, the image sensor control unit 107, the image processing unit 108, and the LCD control unit 111.

A pair of above-described focus detection CCD sensors (the CCD line sensor 119) that detects a focus is connected to the focus detection and control unit 120. The focus detection and control unit 120 performs analog-to-digital (A/D) conversion processing on a voltage signal sent from the CCD line sensor 119 and sends the A/D-converted voltage signal to the CPU 101.

According to the instruction from the CPU 101, the focus detection and control unit 120 controls the accumulation time of the CCD line sensor 119 and automatic gain control (AGC).

The CPU 101 processes the signal from the focus detection and control unit 120. Thereby, the CPU 101 calculates a lens driving amount for driving each lens so as to change the focusing of a main object from a detected current focusing state of the main object to an in-focus state. Then, the CPU 101 issues an instruction to the photographic lens drive unit 125.

The photographic lens drive unit 125 moves a focusing lens in the photographic lens according to the instruction. Thus, the main object can be focused.

The above-described light metering sensor 131 detects the luminance of the object. Then, the light metering sensor 131 sends a luminance signal to the CPU 101. After receiving the luminance signal from the light metering sensor 131, the CPU 101 calculates the amount of exposure of the camera based on the luminance information. The CPU 101 determines either of or both of a shutter speed or an aperture value for the photographic lens 105.

In addition, the CPU 101 issues an instruction for starting a photographing operation when the photographer has pressed the release SW 114. Furthermore, the CPU 101 controls processing for outputting a control signal for controlling the supply of power to each element, to the DC/DC converter 117.

The RAM 103 includes an image rasterization area 103a, a work area 103b, a video random access memory (VRAM) 103c, and a temporary save area 103d.

The image rasterization area 103a is used as a temporary buffer area for temporarily storing a photographed image (YUV digital signal) sent from the image processing unit 108 and JPEG-compressed image data read from the data storage unit 104. Furthermore, the image rasterization area 103a is used as an image processing-dedicated work area for performing image compression and compressed image decompression processing thereon.

The work area 103b is a work area for temporarily storing various types of programs. The VRAM 103c is used as a VRAM for storing display data to be displayed on the display unit 132. The temporary save area 103d is an area for temporarily saving various types of data.

The data storage unit 104 is a flash memory for storing, as a file, image data of the photographed image that has been JPEG-compressed by the CPU 101 or various types of ancillary data referred to by the application.

The image sensor control unit 107 includes a timing generator for supplying a transfer clock signal or a shutter signal to the image sensor 106 and a circuit for removing noises from the signal output from the image sensor 106 and performing gain correction processing thereon. In addition, the image sensor control unit 107 includes A/D conversion circuit that converts an analog signal into 10-bit digital signal.

The image processing unit 108 performs various image processing such as gamma conversion processing, color space conversion processing, white balance adjustment processing, automatic exposure (AE) processing, or flash correction processing on the 10-bit digital signal output from the image sensor control unit 107 and outputs an 8-bit digital signal of YUV (4:2:2) format.

The LCD control unit 111 receives the YUV digital image data transferred from the image processing unit 108 or the YUV digital image data obtained by decompressing the JPEG-compressed image file stored in the data storage unit 104. Then, the LCD control unit 111 converts the YUV digital image data into RGB digital image signal and outputs the converted RGB digital image signal to the display drive unit 112. The display drive unit 112 performs control for driving the display unit 132.

The release SW 114 is a switch that can be operated by the photographer (user) to issue an instruction for starting a photographing operation. The release SW 114 has two switch positions for different stages distinguished according to the level of pressure applied to a release button (not illustrated).

More specifically, when it is detected that the user has pressed the release switch to its first position ("SW1-ON"), the CPU 101 performs an operation for locking the setting for the digital camera with respect to the white balance adjustment, the AE, and the like. When it is detected that the user has pressed the release switch to its second position ("SW2-ON"), the CPU 101 performs an operation for capturing an image signal of the object.

The battery cell 116 is a rechargeable secondary battery or a dry battery. Furthermore, the DC/DC converter 117 receives power from the battery cell 116, generates powers of a plurality of different voltage levels by stepping up and regulating the voltage, and supplies power to each element with an appropriate level of voltage. The DC/DC converter 117 can control the start and the discontinuation of the supply of each voltage according to a control signal from the CPU 101.

Figure 3:
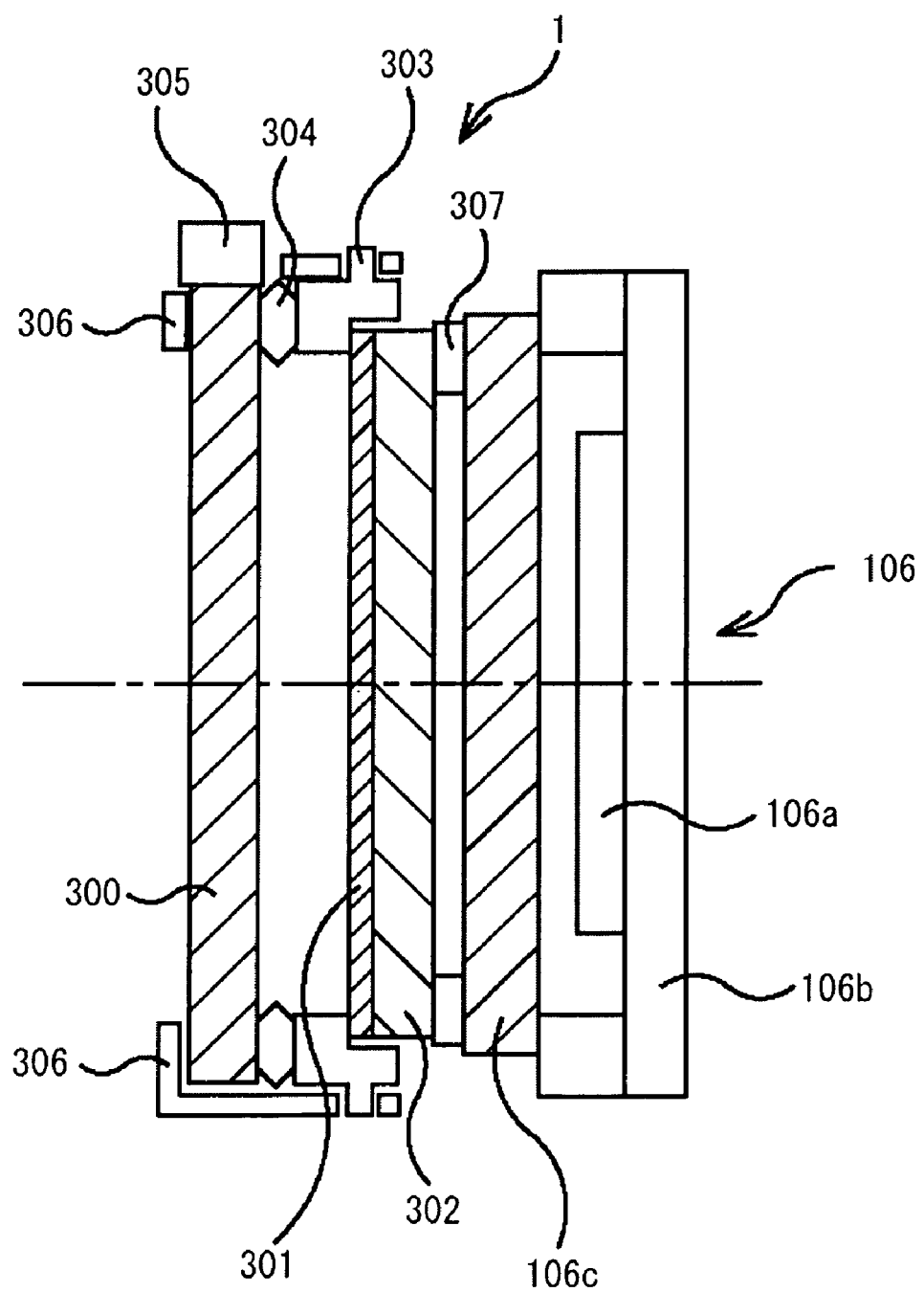
FIG. 3 is an enlarged view of a portion around an optical filter and an image sensor of the digital camera according to the first exemplary embodiment of the present invention.

Now, the optical filter 1 illustrated in FIG. 1 is described in detail with reference to FIG. 3. FIG. 3 is an enlarged view of the peripheral portion of the optical filter 1 and the image sensor 106 according to the present exemplary embodiment.

The present exemplary embodiment employs an optical low-pass filter having a configuration for performing four-point image division processing to suppress a fake color of the photographed image in the array (Bayer array) of color filters of the image sensor. With the above-described configuration, a high frequency component of a light flux that has transmitted through the photographic lens 105 can be attenuated and the infrared light wavelength component of the light flux can be cut.

The birefringent crystal plate 300 having a rotational angle of 0° divides the object image into two in the horizontal direction (horizontal two-point division). Here, the point image division width caused by the birefringent effect of crystal is about 5.87 μm per 1 mm of the crystal. Accordingly, a necessary division width can be easily calculated by multiplying the thickness of the crystal material by the point-image division width value (proportionately multiplying by the point-image division width value).

An infrared light absorbing glass (an infrared light absorbing filter or an infrared light cut filter) 302 approximately matches the spectral sensitivity of the image sensor 106 with the visibility of a person.

A film-like resin filter 301 including polyimide has an effect of the $\lambda/4$-wave plate. The film-like resin filter 301 depolarizes the polarized object reflection light that has been linearly polarized by the birefringent crystal plate 300. In other words, the film-like resin filter 301 has a phase difference offset effect.

The film-like resin filter 301 is bonded to a front surface of the infrared light absorbing glass 302. A non-bonded surface of the film-like resin filter 301 (the surface opposing the photographic lens 105) is disposed and fixed so as to face the birefringent crystal plate 300.

Conventionally, crystal is generally used for a depolarization plate. However, in the case of using a polyimide film, a plate of about 0.1 mm thick can be manufactured, which is only a fraction of thickness of the plate using crystal. Accordingly, the space within the digital camera can be effectively used. In addition, in this case, the depolarization processing hardly depends on the wavelength. Accordingly, the phenomenon of fake color can be effectively prevented.

A filter retaining member 303 retains the birefringent crystal plate 300 and the infrared light absorbing glass 302.

The birefringent crystal plate 300 is pressed and held against the filter retaining member 303 via an elastic member 304. The infrared light absorbing glass 302 is fixed so that its front surface faces the birefringent crystal plate 300. The elastic member 304 is made of an elastomer (a high polymer).

The birefringent crystal plate 106c having a rotational angle of 90° divides the object image into two in a vertical direction (vertical two-point division). The birefringent crystal plate 106c is adhesively bonded to the ceramic package 106b. Thus, the chip portion 106a of the image sensor 106 is appropriately protected.

An adhesive sheet 307 provides a sealing between the optical filter 1 including the birefringent crystal plate 300, the film-like resin filter 301 and the infrared light absorbing glass 302, and the birefringent crystal plate 106c to fix the birefringent crystal plate 106c to the optical filter 1 and thereby prevent the entrance of a foreign substance such as dusts.

The vibration element 305 is adhered and fixed at an upper end portion of the birefringent crystal plate 300. The vibration element 305 vibrates the birefringent crystal plate 300 to remove a foreign substance such as dusts adhered to a surface of the birefringent crystal plate 300 opposed to the photographic lens 105.

The vibration element 305 according to the present exemplary embodiment is a lamination type piezoelectric element in which a piezoelectric member and an internal electrode are alternately laminated. The vibration element 305 generates a larger amplitude (displacement) in a direction of the lamination. Accordingly, the birefringent crystal plate 300 can be vibrated and displaced largely in a direction orthogonal to a photographing optical axis.

A pressing member 306 includes a metal plate having a characteristic of a spring (biasing force). The pressing member 306 applies pressure to the birefringent crystal plate 300 against the elastic member 304. Thus, the birefringent crystal plate 300 is floatingly retained (pressed and retained) against the filter retaining member 303.

With the above-described configuration, the birefringent crystal plate 300 can vibrate according to the expansion and contraction of the vibration element 305 which prevents damage and scratch of the birefringent crystal plate 300 due to the vibration.

Furthermore, the birefringent crystal plate 300 is sealed around its four edges with the filter retaining member 303 via the elastic member 304 so as to leave no gap therebetween.

Thus, in a state where the filter retaining member 303 retains the birefringent crystal plate 300 and the infrared light absorbing glass 302, the film-like resin filter 301 is disposed in an enclosed space provided between the birefringent crystal plate 300 and the infrared light absorbing glass 302.

In order to increase a color reproduction characteristic of the photographed image, an ultraviolet (UV)-infrared ray (IR) cut coating is applied to a surface of the birefringent crystal plate 300 opposing the photographic lens 105.

In addition, an anti-reflection (AR) coating is applied to a back surface of the birefringent crystal plate 300, a surface of the film-like resin filter 301 opposing the photographic lens 105 (the non-bonded surface), a surface of the infrared light absorbing glass 302 opposing the image sensor 106, and both sides of the birefringent crystal plate 106c attached and adhering to the image sensor 106.

By using an optical filter having the above-described configuration, it is possible to prevent the degradation of the optical performance of the optical low-pass filter that may occur due to the absorption of moisture by the film-like resin filter 301. In addition, by using such an optical filter, it is possible to effectively suppress the problem of the low environmental resistance of an optical low-pass filter that may arise due to flaking of the anti-reflection coating applied to a surface thereof.

Furthermore, in assembling the optical low-pass filter, the film-like resin filter 301, which is easy to be scratched or damaged, is housed within the optical filter. Accordingly, the optical filter having the above-described configuration can be easily handled in the course of assembling the digital camera once the optical filter is assembled.

In addition, the film-like resin filter 301 is disposed at a position farthest from the chip portion 106a of the image sensor 106, except for the birefringent crystal plate 300 which is a vibration object. Therefore, according to the present exemplary embodiment, a scratch or a defect on the film surface is less visible.

Note that in the example illustrated in FIG. 3, the film-like resin filter 301 and the infrared light absorbing glass 302 that have a substantially similar outer shape are laminated. However, the present invention is not limited to this configuration.

More specifically, it is also useful if the film-like resin filter 301 has a relatively smaller outer shape so that the infrared light absorbing glass 302 can be directly attached to the filter retaining member 303. In this case, the level of enclosure (the sealing characteristic) of the space in which the film-like resin filter 301 is disposed can be further increased. Accordingly, the environmental resistance of the optical low-pass filter can be improved.

Now, an operation of the digital camera according to the present exemplary embodiment will be described below with reference to FIG. 4.

Figure 4:
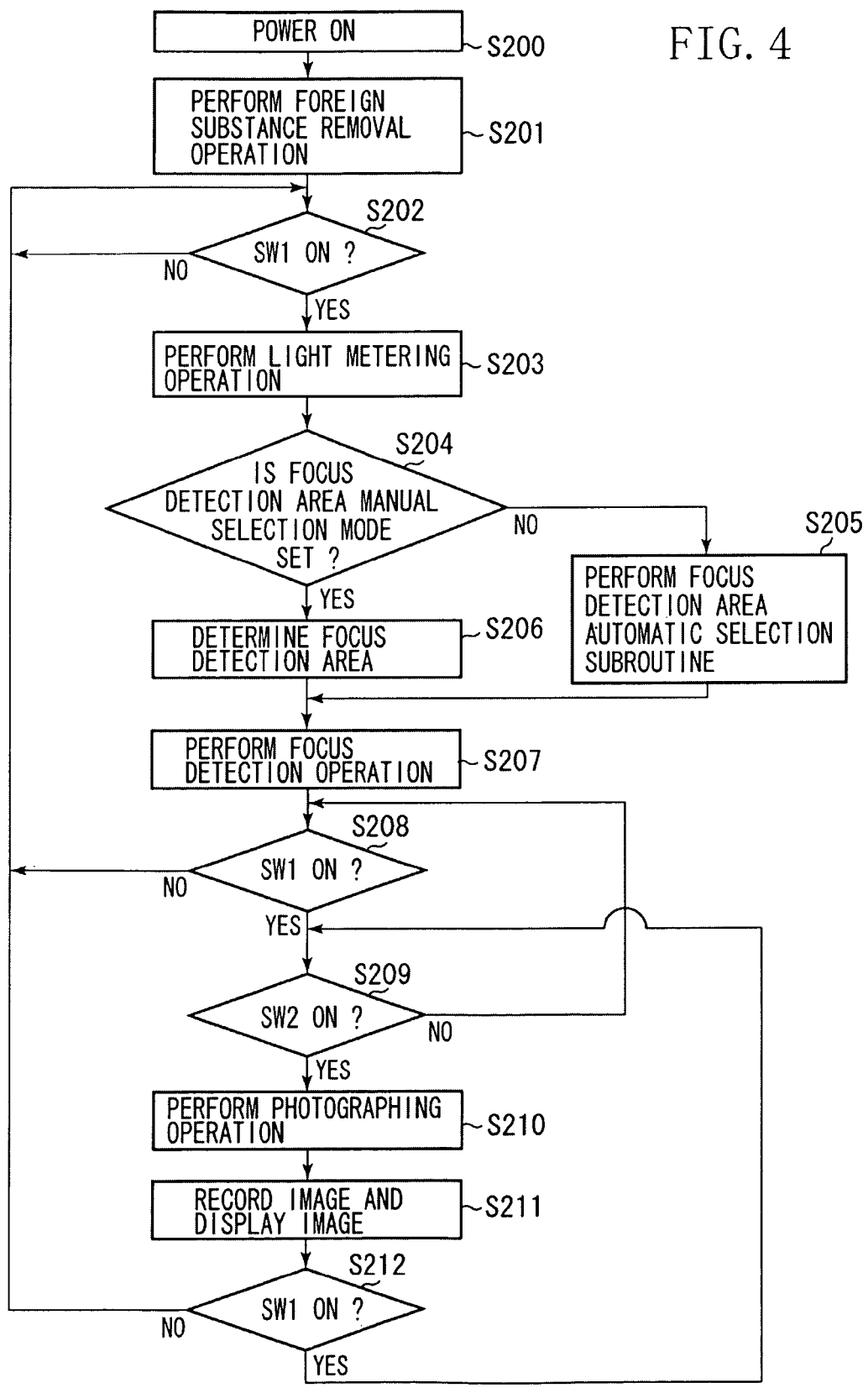
FIG. 4 is a flow chart illustrating an example of an operation of the digital camera according to the first exemplary embodiment of the present invention.

Referring to FIG. 4, in a case where the digital camera is in a non-operating state, when the user presses a power switch (not illustrated), the CPU 101 starts the operation of the digital camera in step S200.

In step S201, the CPU 101, in order to remove a foreign substance such as dusts, controls the vibration element 305 via the vibration circuit unit 109 and vibrates the birefringent crystal plate 300 of the optical filter 1, which is disposed at a position closest to the photographic lens 105, by using the vibration element 305.

In step S202, the CPU 101 waits until the user presses the release button to set the switch SW1 to an "ON" state. If it is determined in step S202 that the switch SW1 has been pressed by the user (YES in step S202), then the processing advances to step S203.

In step S203, the CPU 101 acquires information about the luminance of the object by dividing the photographing object into 3×5 areas, from the light metering sensor 131. Then, the CPU 101 stores the acquired object luminance information on a memory.

Furthermore, the CPU 101 determines an aperture value for the photographic lens 105 and a shutter speed, which are an exposure value for the digital camera, based on the object luminance information acquired in step S203. The determination is made by using a predetermined light metering algorithm according to a program installed in the digital camera.

An algorithm for calculating an optimum exposure value according to the luminance information obtained with respect to each one of 3×5 (fifteen) areas sent from the light metering sensor 131, can be realized by simple averaging. Alternatively, assigning a maximum weight to the light metering area corresponding to a focus detection area determined in step S206 can also be used as the algorithm for calculating the optimum exposure value. The processing in step S206 will be described in detail later below.

In step S204, the CPU 101 determines whether the focus detection area selection mode has been set by the user to a manual selection mode.

If it is determined in step S204 that the focus detection area selection mode has been set by the user to a manual selection mode (YES in step S204), then the processing advances to step S206.

In step S206, the photographer (user) can arbitrarily select one of focus detection areas by operating a dial-like switch (not shown).

On the other hand, if it is determined in step S204 that the focus detection area selection mode is set by the user to an automatic selection mode (NO in step S204), then the processing advances to step S205.

In step S205, the CPU 101 selects one from among a plurality of focus detection areas by performing a focus detection area automatic selection subroutine according to the defocusing amount in the focus detection area. The defocusing amount corresponds to fifteen focus detection area display portions of a publicly known phase difference type focus detection unit.

As the algorithm for automatically selecting a focus detection area, various methods can be used. Among such various methods, a near point priority algorithm that assigns a weight to a central focus detection area, which is a publicly known algorithm for a multipoint AF camera, is useful.

Thus, the CPU 101 determines one focus detection area regardless of whether the user has selected a manual mode or an automatic mode for the focus detection area selection mode. Then, the CPU 101 determines a final lens driving amount according to a focus detection deviation amount (defocusing amount) obtained in the focus detection area determined in step S205 or step S206, and a lens driving sensitivity of the photographic lens 105 mounted on the digital camera.

In step S207, the CPU 101 sends a signal to the photographic lens drive unit 125 according to the signal from the CCD line sensor 119 in a state before moving the lens and drives the photographic lens 105 by a predetermined amount.

Meanwhile, the CPU 101 illuminates a focus detection area display portion (not shown) corresponding to the focus detection area determined in step S205 or step S206 to display which portion of the object area the photographic lens 105 has focused on.

In step S208, the CPU 101 determines whether the user has pressed the switch SW1 (to an "ON" state). As described above, the CPU 101 displays information about the focusing state. The photographer (user) looks in the view field through the viewfinder screen that currently displays information about the focusing state and continues to press the switch SW1 (ON).

If it is determined in step S208 that the user has pressed the switch SW1 (ON) (YES in step S208), then the processing advances to step S209. In step S209, the CPU 101 determines whether the user has further pressed the release button to press a switch SW2 (ON).

If it is determined in step S209 that the user has further pressed the release button to press a switch SW2 (ON) (YES in step S209), then the processing advances to step S210. In step S210, the CPU 101 sends a signal to a shutter control unit (not shown), an aperture stop driving part (not shown) and the image sensor control unit 107 to perform a publicly known photographing operation.

On the other hand, if it is determined in step S208 that the user has not pressed the switch SW1 (OFF) (NO in step S208), then the processing returns to step S202. In step S202, the CPU 101 waits until the user presses the switch SW1 (ON) On the other hand, if it is determined in step S209 that the user has not pressed the switch SW2 (OFF) (NO in step S209), then the processing returns to step S208. In step S208, the CPU 101 waits until the user presses the switch SW2 (ON).

In the photographing operation in step S210, the CPU 101 first supplies power to a motor (not illustrated) via a motor control unit (not illustrated) and flips up the semi-transparent main mirror 121 and reduces the aperture value of the photographic lens 105.

Then, the CPU 101 supplies power to a magnet MG-1 of the shutter 133 and opens a first curtain of the shutter 133. At this time, the CPU 101 starts accumulating the object reflection light on the image sensor 106.

After a predetermined shutter speed time period has elapsed, the CPU 101 supplies power to a magnet MG-2 and closes a second curtain of the shutter 133. At this time, the CPU 101 ends the accumulation of the object reflection light on the image sensor 106.

Next, the CPU 101 starts supplying power to the motor again, performs mirror-down processing and shutter charging processing, and ends the operation (photographing operation) of a series of shutter release sequences. As described above, the CPU 101 accumulates a light amount of the light reflected from the object image.

The object image exposed on the image sensor 106 by the photographing operation in step S210 is then photoelectrically converted into digital image data of about 5,000,000 pixels (2,560×1,920 pixels) by the image processing unit 108. Then, the image data is temporarily stored in the image rasterization area 103a.

In step S211, the CPU 101 converts the entire digital image data of 2,560×1,920 pixels stored in the image rasterization area 103a into entire image data of 340×240 pixels. The converted image data is obtained by thinning out the original image data to one-eighth vertically and horizontally, to display the resulting image data on the display unit 132.

Then, after saving the resulting image data on the VRAM 103c that is used for storing display data, the CPU 101 displays the entire image data of 340×240 pixels on the display unit 132.

As described above, the photographer (user) can verify the entire portion of the photographed image by referring to the image data displayed on the display unit 132.

On the other hand, the entire digital image data of 2,560× 1,920 pixels stored in the image rasterization area 103a is then JPEG-compressed and the JPEG-compressed image data is recorded by the data storage unit 104 on a recording medium such as a CompactFlash® as image data.

In step S212, the CPU 101 waits until the user presses the switch SW1 again. Until the user presses the switch SW1, the CPU 101 continues the display of the entire image data on the display unit 132.

When the user presses the switch SW1 again in this state, the CPU 101 discontinues the display of the entire image data on the display unit 132. Then, the processing returns to step S209. In step S209, the CPU 101 waits until the user presses the switch SW2 again. If it is determined in step S209 that the user has not pressed the switch SW2 (NO in step S209), then the processing returns to step S202 to wait for the user to press the switch SW1.

Second Exemplary Embodiment

Now, a second exemplary embodiment of the present invention is described below with reference to FIG. 5.

The configuration of the entire digital camera and the operation thereof are the same as those in the first exemplary embodiment. Accordingly, points different from the first exemplary embodiment are mainly described. It is to be also noted that the components and units that are the same as those of the first exemplary embodiment are provided with the same numerals and symbols. Accordingly, the detailed description thereof will not be repeated here.

Figure 5:
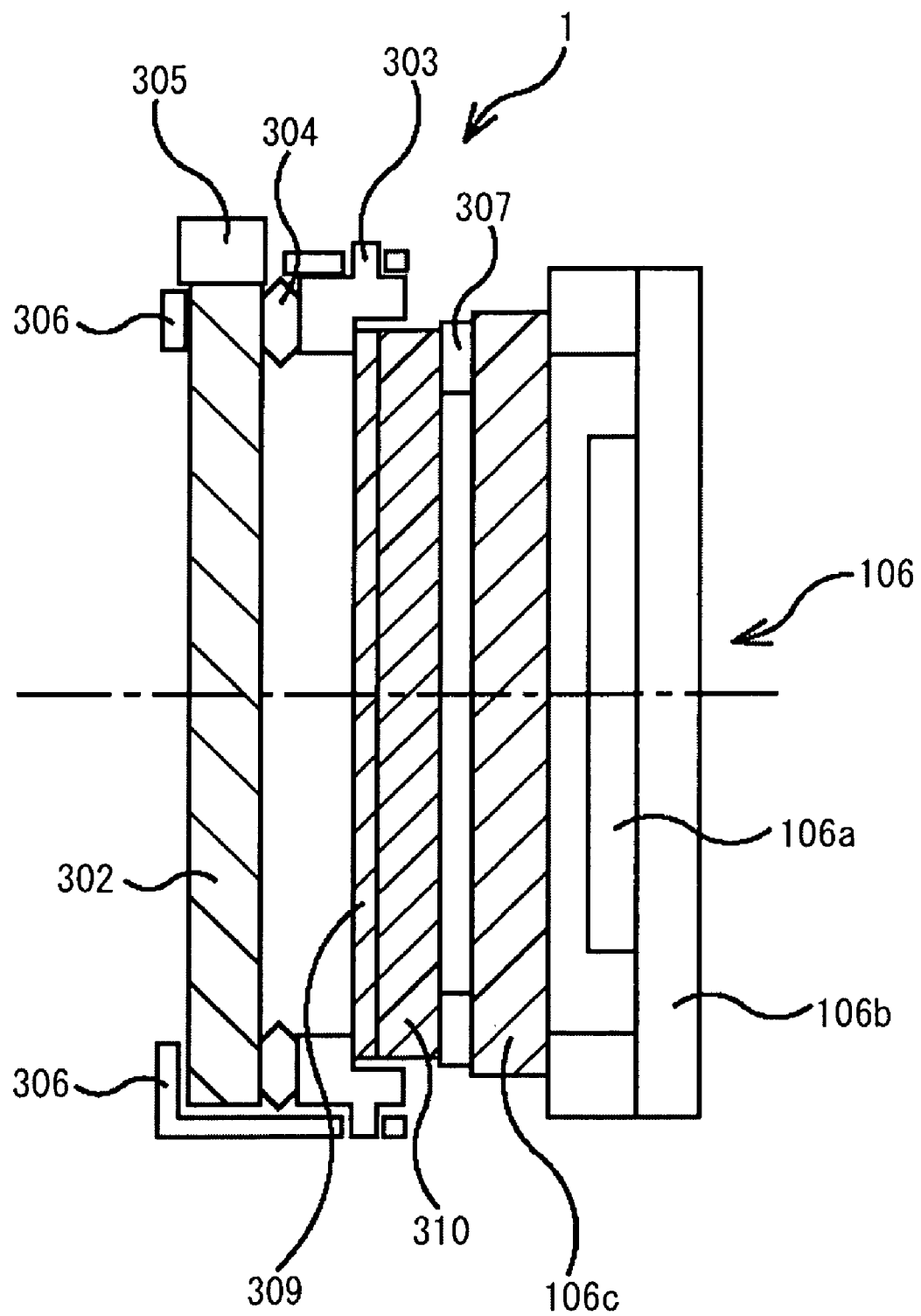
FIG. 5 is an enlarged view of a portion around the optical filter and the image sensor of the digital camera according to a second exemplary embodiment of the present invention.

Referring to FIG. 5, the infrared light absorbing glass (an infrared light absorbing filter or an infrared light cut filter) 302 substantially matches the spectral sensitivity of the image sensor 106 with the visibility of a person. In the present exemplary embodiment, the infrared light absorbing glass 302 is vibrated to remove the foreign substance such as dusts.

A λ/4-wave plate 310 depolarizes the object reflection light that has been linearly polarized by the birefringent crystal plate 300.

A optical anisotropic polymer film-like resin filter (the birefringent film) 309 has a birefringence effect. The film-like resin filter 309 divides the object image into two in the horizontal direction (horizontal two-point division).

The film-like resin filter 309 is bonded to a front surface of the λ/4 wavelength plate 310. A non-bonded surface of the film-like resin filter 309 (the surface opposing the photographic lens 105) is disposed and fixed so as to face the infrared light absorbing glass 302.

In the present exemplary embodiment also, in a state where the filter retaining member 303 retains the infrared light absorbing glass 302 and the λ/4 wavelength plate 310, the film-like resin filter 309 is disposed in an enclosed space provided between the infrared light absorbing glass 302 and the λ/4 wavelength plate 310.

Third Exemplary Embodiment

A third exemplary embodiment of the present invention will now be described in detail below with reference to FIG. 6.

The configuration of the entire digital camera and the operation thereof are the same as those in the first exemplary embodiment. Accordingly, points different from the first exemplary embodiment are mainly described in detail. It is also to be noted that the components and units that are the same as those of the first exemplary embodiment are provided with the same numerals and symbols. Accordingly, the detailed description thereof will not be repeated here.

Figure 6:
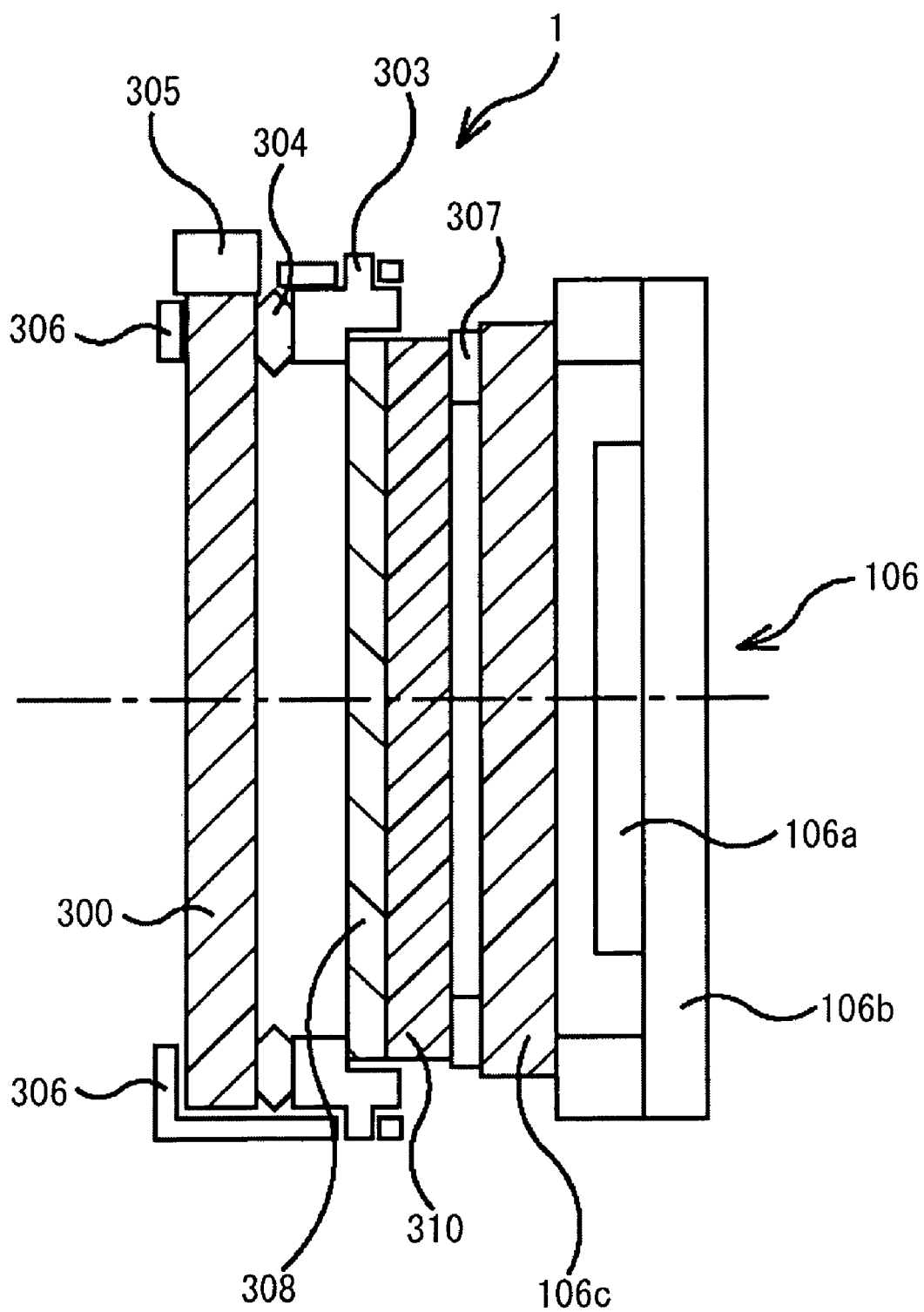
FIG. 6 is an enlarged view of a portion around the optical filter and the image sensor of the digital camera according to a third exemplary embodiment of the present invention.
Figure 7:
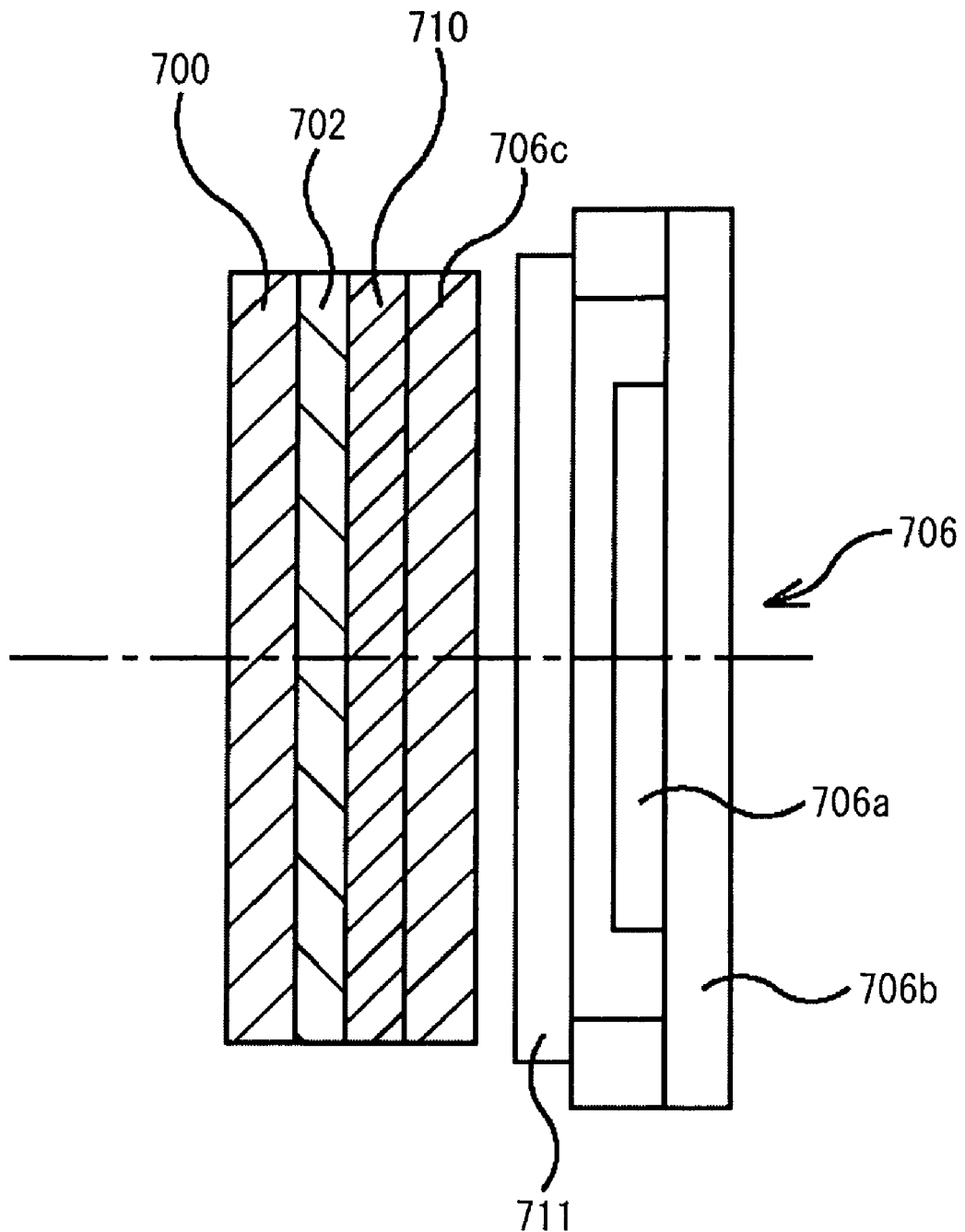
FIG. 7 illustrates an example of a configuration of a conventional optical low-pass filter.

In FIG. 6, the birefringent crystal plate 300 having a rotational angle of 0° divides the object image into two in the horizontal direction (horizontal two-point division). In the present exemplary embodiment, the birefringent crystal plate 300 is vibrated to remove the foreign substance such as dusts.

The λ/4-wave plate 310 depolarizes the object reflection light that has been linearly polarized by the birefringent crystal plate 300.

A film-like resin filter (an infrared absorption film made of a resin) 308 includes the infrared light absorbing effect. The film-like resin filter 308 substantially matches the spectral sensitivity of the image sensor 106 with the visibility of a person.

More specifically, LUMICLE UCF of KUREHA CORPORATION can be used as the film-like resin filter 308.

The film-like resin filter 308 is boded to a front surface of the λ/4 wavelength plate 310. A non-bonded surface of the film-like resin filter 308 (the surface opposing the photographic lens 105) is disposed and fixed so as to face the birefringent crystal plate 300.

In the present exemplary embodiment also, in a state where the filter retaining member 303 retains the birefringent crystal plate 300 and the λ/4 wavelength plate 310, the film-like resin filter 308 is disposed in an enclosed space provided between the birefringent crystal plate 300 and the λ/4 wavelength plate 310.

As described above, in the present exemplary embodiment, the filter is not exposed to the air by disposing the film-like resin filter between the two optical members. Accordingly, the present exemplary embodiment can solve the low environmental resistance of a film-like resin filter. As a result, the present exemplary embodiment can provide an optical low-pass filter useful in reducing the size, the weight, and the costs of the imaging apparatus.

Furthermore, in assembling the optical low-pass filter, the film-like resin filter, which is easy to be scratched or damaged, is housed within the optical filter. Accordingly, the optical filter having the above-described configuration can be easily handled in the course of assembling the digital camera once the optical filter is assembled.

In addition, according to the present exemplary embodiment, the film-like resin filter can be disposed at a position relatively distant from a surface of the image sensor. Therefore, a scratch or a defect on the film surface can be less visible.

Furthermore, the present exemplary embodiment can provide a small-sized imaging apparatus, which can also execute a foreign substance removal function. The small-sized imaging apparatus according to the present exemplary embodiment vibrates a part of an optical member that constitutes a low-pass filter including an infrared light absorbing filter, to remove a foreign substance such as dusts adhering to an optical member.

More specifically, the optical member exposed to the air is vibrated and an optical resin film having the birefringent effect, the depolarization effect, or the infrared light absorbing effect can be disposed in the enclosed space of the vibration unit. Accordingly, the present exemplary embodiment can implement an optical low-pass filter that has a high environmental resistance.

In the first and the third exemplary embodiments of the present invention, the birefringent crystal plate 300 and the birefringent crystal plate 106c are used to implement the birefringent effect. However, the present invention is not limited to these exemplary embodiments. More specifically, a transparent member made of lithium niobate having the birefringent effect can be used.

In addition, it is also useful if a resin film having the birefringent effect and a film having the infrared light absorbing effect are disposed in a laminated manner between a transparent and colorless glass (the birefringent crystal plate 300 and the birefringent crystal plate 106c).

Furthermore, in the above-described exemplary embodiments, the resin film has been bonded to the front surface of a second optical member disposed at a position (the position closer to the image sensor 106) away behind the position of a first optical member. However, it is also useful if the second optical member is bonded to the back surface of the first optical member.

Furthermore, it is also useful if the resin film is bonded to both the first and the second optical members.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-341263 filed Dec. 28, 2007, which is hereby incorporated by reference herein in its entirety.

What is claimed is:

1. An imaging apparatus comprising:
   an image sensor;
   a first optical member disposed in front of the image sensor;

a second optical member disposed between the first optical member and the image sensor;

a vibration element configured to provide vibration to the first optical member;

a holder configured to retain the first optical member and the second optical member, wherein the holder retains the first optical member elastically and the second optical member rigidly so that the second optical member is not vibrated directly when the vibrating element vibrates the first optical member, and the holder provides an enclosed space between the rear surface of the first optical member and the front surface of the second optical member; and a film-like resin filter bonded to the front surface of the second optical member in the enclosed space, wherein an outer shape of the film-like resin filter is smaller than an outer shape of the second optical member so that the second optical member is directly attached to the holder.

2. The imaging apparatus according to claim 1, wherein the first optical member and the second optical member are constituted by either one of a crystal material, a transparent member having a birefringence effect, and an infrared light cut filter for cutting an infrared wavelength component, and wherein the film-like resin filter has a phase difference offset effect, the birefringent effect, and an infrared light absorbing effect.

3. An optical filter configured to attenuate a high frequency component of a light flux that transmits the optical filter and cut an infrared light wavelength component of the light flux, the optical filter comprising:

a first optical member;

a second optical member;

a vibration element configured to provide vibration to the first optical member;

a holder configured to retain the first optical member and the second optical member, wherein the holder retains the first optical member elastically and the second optical member rigidly so that the second optical member is not vibrated directly when the vibrating element vibrates the first optical member, and wherein the holder provides an enclosed space between the rear surface of the first optical member and the front surface of the second optical member; and a film-like resin filter bonded to the front surface of the second optical member in the enclosed space, wherein an outer shape of the film-like resin filter is smaller than an outer shape of the second optical member so that the second optical member is directly attached to the holder.

4. The optical filter according to claim 3, wherein the first optical member and the second optical member are constituted by either one of a crystal material, a transparent member having a birefringence effect, and an infrared light cut filter for cutting an infrared wavelength component, and wherein the film-like resin filter has a phase difference offset effect, the birefringent effect, and an infrared light absorbing effect.

* * * * *